United States Patent
Schoenmeyr

[11] Patent Number: 5,658,457
[45] Date of Patent: Aug. 19, 1997

[54] HYDROSTICALLY DRIVEN OSMOTIC MEMBRANE FLUSH SYSTEM FOR A REVERSE OSMOSIS WATER PURIFICATION SYSTEM

[75] Inventor: Ivar Schoenmeyr, Mission Viejo, Calif.

[73] Assignee: Aquatec Water Systems, Inc., Anaheim, Calif.

[21] Appl. No.: 585,653

[22] Filed: Jan. 16, 1996

Related U.S. Application Data

[63] Continuation of Ser. No. 234,289, Apr. 28, 1994, abandoned.
[51] Int. Cl.$^6$ ............................................ B01D 21/24
[52] U.S. Cl. .......................... 210/97; 210/85; 210/86; 210/100; 210/106; 210/134; 210/257.2; 210/333.01; 210/636
[58] Field of Search ............................ 210/257.2, 195.1, 210/257.1, 195.2, 321.75, 321.84, 333.1, 333.01, 86, 134, 106, 85, 636, 100, 103

[56] References Cited

U.S. PATENT DOCUMENTS

| | | | |
|---|---|---|---|
| 4,014,792 | 3/1977 | Gossett et al. | 210/257.2 |
| 4,124,488 | 11/1978 | Wilson | 210/134 |
| 4,160,727 | 7/1979 | Harris, Sr. | 210/97 |
| 4,252,650 | 2/1981 | Mas et al. | 210/98 |
| 4,332,685 | 6/1982 | Nowlin et al. | 210/257.2 |
| 4,814,086 | 3/1989 | Bratt | 210/652 |
| 5,071,567 | 12/1991 | Corcelle et al. | 210/116 |
| 5,082,557 | 1/1992 | Grayson et al. | 210/257.2 |
| 5,083,442 | 1/1992 | Vlock | 210/257.2 |
| 5,232,590 | 8/1993 | Reid | 210/257.2 |
| 5,254,243 | 10/1993 | Carr et al. | 210/94 |
| 5,256,279 | 10/1993 | Voznick et al. | 210/86 |
| 5,290,442 | 3/1994 | Clack | 210/257.1 |

*Primary Examiner*—Ana Fortuna
*Attorney, Agent, or Firm*—Blakely Sokoloff Taylor & Zafman

[57] ABSTRACT

A reverse osmosis water purification system which has a tank coupled to an osmotic membrane so that the water within the tank flushes the osmotic membrane. The tank has an opening that is in fluid communication with a source of feed water and an osmotic membrane. The tank may also have a lower level switch and an upper level switch that are coupled to a pump that pumps water through the membrane. When the tank water falls to the level of the lower switch, the pump is activated and purified water is pump into the tank. When the tank water reaches the level of the upper switch the pump is deactivated. The opening is located at an elevation above the membrane, so that when the water level within the tank reaches the height of the opening, the feed water pump turns off and the tank water provides a hydrostatic pressure that drives the water back through the membrane to flush the same. The upper switch is located above the opening so that a sufficient amount of water flows back through the membrane.

7 Claims, 1 Drawing Sheet

5,658,457

HYDROSTICALLY DRIVEN OSMOTIC MEMBRANE FLUSH SYSTEM FOR A REVERSE OSMOSIS WATER PURIFICATION SYSTEM

This is a continuation application of application Ser. No. 08/234,289, filed Apr. 28, 1994, now abandoned.

BACKGROUND OF THE INVENTION

1. Field of the Invention

The present invention relates to a method and apparatus for flushing the filter membrane of a reverse osmosis water purification system.

2. Description of Related Art

Reverse osmosis (RO) water purification systems contain an osmotic membrane that removes impurities from water. The purified water is typically stored in a tank for subsequent removal by the user. The filter membrane is usually housed within a filter unit that has an inlet port, and outlet port and a drain. The drain removes the excess water that does not flow through the membrane. The outlet port is coupled to the tank. The inlet port is connected to a municipal water line, typically through one or more prefilters.

The municipal water pressure is typically sufficient to push the water through the membrane. For filter sites that have relatively low water pressure, the RO system may include a pump which pumps the water through the osmotic membrane. The pump is typically coupled to level sensors within the tank that activate and deactivate the pump when the water level within the tank reaches predetermined lower and upper levels, respectively.

To extend the use of an RO system, the osmotic membrane is periodically flushed to remove the impurities from the surface of the membrane. Some systems utilize the pump to direct water into the outlet port of the filter unit and back into the drain. Systems with bladder pressurized accumulators may utilize the pressure of the bladder to direct water back through the filter system. Flushing the membrane with a pump or bladder increases the complexity of the system. Additionally, some systems do not have a pump or bladder to pump the flush water, therefore such systems are not capable of flushing the membrane. It would be desirable to have an RO system that can flush the osmotic membrane without requiring the use of a pump or other similar pumping device.

SUMMARY OF THE INVENTION

The present invention is a reverse osmosis water purification system which has a tank coupled to an osmotic membrane so that the water within the tank flushes the osmotic membrane. The tank has an opening that is in fluid communication with a source of feed water and an osmotic membrane. The tank may also have a lower level switch and an upper level switch that are coupled to a pump that pumps water through the membrane. When the tank water falls to the level of the lower switch, the pump is activated and purified water is pump into the tank. When the tank water reaches the level of the upper switch the pump is deactivated. The opening is located at an elevation above the membrane, so that when the water level within the tank reaches the height of the opening, the feed water pump turns off and the tank water provides a hydrostatic pressure that drives the water back through the membrane to flush the same. The upper switch is located above the opening so that a sufficient amount of water flows back through the membrane.

It is therefore an object of the present invention to provide a hydrostatically driven osmotic membrane flushing subsystem for a reverse osmosis water purification system.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
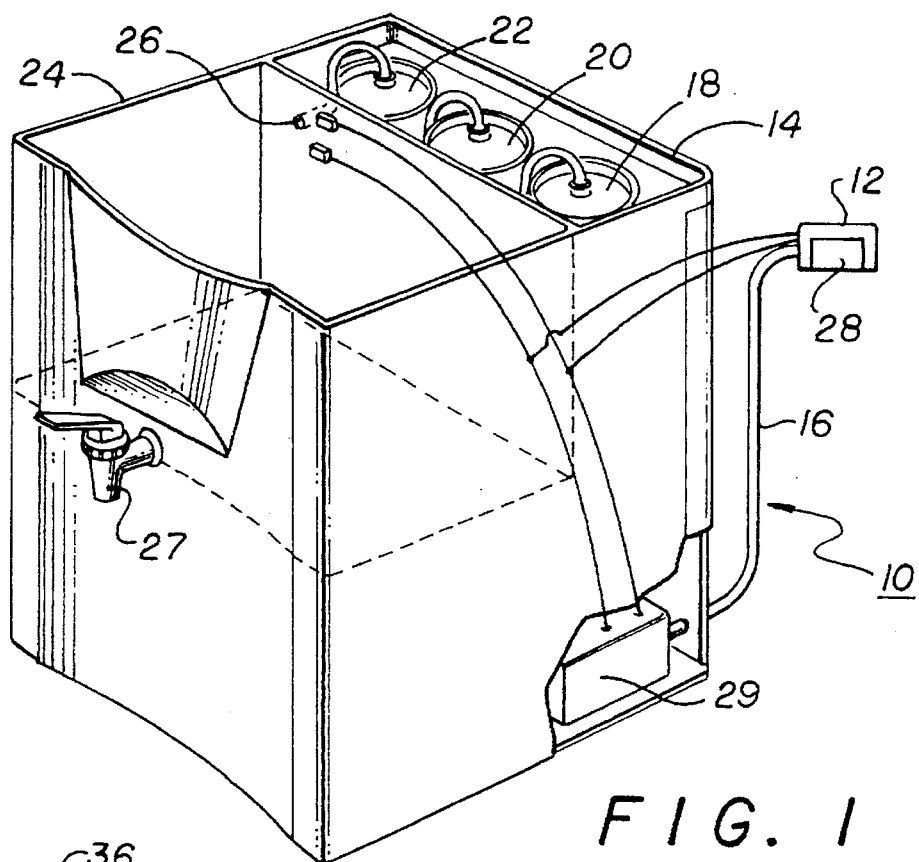
FIG. 1 is a perspective view of a reverse osmosis water purification system of the present invention.

Referring to the drawings more particularly by reference numbers, FIG. 1 shows a reverse osmosis water purification system 10 of the present invention. The system 10 is typically connected to a municipal source of water through a faucet (not shown). To facilitate assembly to the faucet, the system 10 may contain an adapter 12. The adapter 12 is connected to a main housing 14 by a hose 16. The hose 16 has a number of passages that allow water to flow to and from the housing 14. The housing 14 typically contains three filter modules 18–22. The first filter module 18 may be a general filter which removes debris from the water. The second filter 20 may contain a carbon bed to remove chlorine from the water. The third filter 22 contains an osmotic membrane that further removes impurities from the water. Although three filter units are shown and described, it is to be understood that the system 10 may have more or less filter units.

The hose 16 is coupled to the inlet of the first filter unit 18, the outlet of the first unit 18 is connected to the inlet of the second filter unit 20 and the outlet of the second filter 20 is connected to the inlet of the third filter unit 22. The third filter unit 22 also has a drain port that is connected to a drain passage (not shown) of the hose 16 and an outlet that is in fluid communication with a tank 24 through tank opening 26. The tank 24 typically has a spigot 27 that allows the user to remove purified water from the system. The adapter 12 typically has a solenoid valve 28. When the solenoid valve is opened, the municipal water flows into the first filter 18, through the second filter 20, across the membrane of the third filter 22 and into the tank 24. The municipal water pressure may be sufficient to drive the water through the filters and across the osmotic membrane. To allow the system to be used at locations that have an insufficient municipal water pressure, the system 10 may have a pump 29 to increase the pressure of the water delivered to the filter units.

Figure 2:
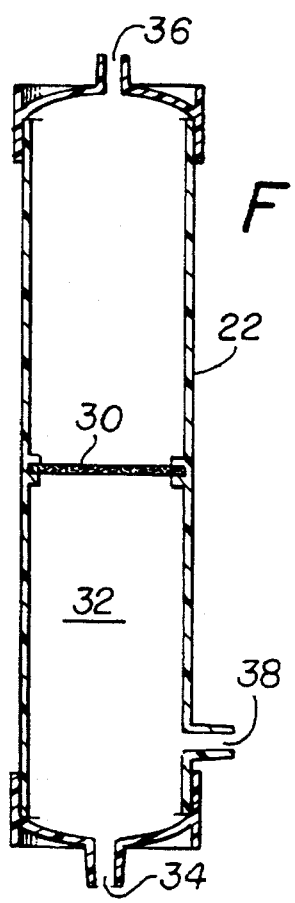
FIG. 2 is a schematic of a filter unit of the system.

FIG. 2 shows the third filter unit 22. The unit 22 has an osmotic membrane 30 within a filter chamber 32. The membrane 30 removes impurities from municipal water introduced to the chamber 32 through inlet port 34. The purified water is released to the tank 24 through outlet port 36. The osmotic membrane 30 is typically constructed from material with a relatively low porosity, such that not all of the municipal water flows across the membrane 30. The excess water is directed out of the chamber 32 through drain port 38.

Figure 3:
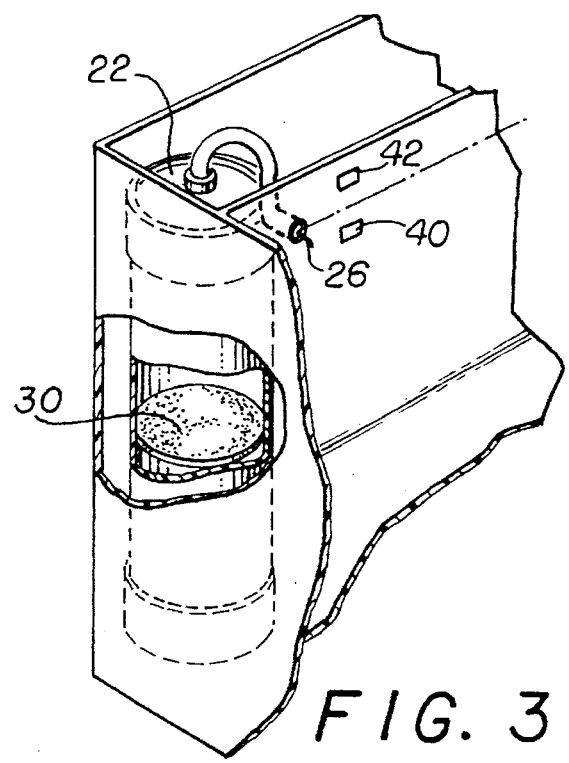
FIG. 3 is a sectional view of the tank showing the relative position of the tank opening and a pair of level switches.

As shown in FIG. 3, the tank opening 26 is located near the top of the tank 24 at an elevation that is above both the osmotic membrane 30 and the hose 16. The tank 24 contains a lower level switch 40 and an upper level switch 42. The switches 40 and 42 are connected to the pump 28 to activate and deactivate the same. If the system does not have a pump 28, the switches can be connected to the adapter 12 to open and close the solenoid valve. The switches 40 and 42 can be any type of level sensing switch used in conventional reverse osmosis systems.

The lower level switch 40 activates the pump 28 when the water level within the tank 24 falls below a level that corresponds to the height of the switch 40. The upper level switch 42 deactivates the pump 28 when the water level exceeds a level that corresponds to the height of the switch 42. The upper switch 42 is located above the opening 26, the lower switch 40 is located below the opening 26. In preferred embodiment, the switches 40 and 42 are approximately 0.5 inches above and below the level of the opening 26.

In operation, when the water level within the tank 24 falls to the lower level, the lower switch 40 activates the pump 28 (or opens the adapter valve), which pumps water through the filter units 18–22 and into the tank 24. Purified water is pumped into the tank until the water level reaches the upper level, wherein the upper switch 42 closes and deactivates the pump 28. The water within the tank 24 has a hydrostatic pressure that corresponds to the height between the top of the water and the adapter 12. The hydrostatic pressure pushes the tank water back into the third filter unit 22 and across the osmotic membrane 30. The back flow of water flushes and removes the impurities from the surface of the osmotic membrane 30. The flush water exits the filter unit 22 through the drain port 38 and is eventually removed from the system through the adapter 12. The purified water will continue to flow through the membrane 30 until the water level within the tank falls below the opening 26. The distance between the upper level switch 42 and the opening 24 should be sufficient to insure that enough water flows across the membrane 30 to thoroughly flush the filter member 30.

What is thus provided is a reverse osmosis water purification unit which has a self-flushing subsystem that can flush the osmotic membrane without running the pump or any other device. The present invention is thus less complex and less expensive than flushing RO systems in the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A reverse osmosis water purification system that purifies a source water provided by a source of water, comprising:

an osmotic membrane in fluid communication with the source of water, said osmotic membrane receives the source water and provides a purified water;

control means for controlling a flow of the source water to said osmotic membrane;

a tank that has a wall and a base that define an inner chamber that is in fluid communication with said osmotic membrane, said inner chamber receives the purified water from said osmotic membrane through an opening that is located in said wall at an elevation above said osmotic membrane such that the purified water will flow back into said osmotic membrane when a purified water level within said inner chamber is at least at said opening; and, an upper level switch that is located no lower than said opening and which is coupled to said control means to terminate the flow of water into said inner chamber when the purified water level within said inner chamber reaches said upper level switch, wherein the purified water flows from said inner chamber back through said osmotic membrane.

2. The system as recited in claim 1, further comprising a lower level switch that is located below said opening and which initiates the flow of water when the purified water level falls below said lower level switch.

3. The system as recited in claim 1, wherein said control means is a pump.

4. The system as recited in claim 1, wherein said control means is a valve.

5. The system as recited in claim 1, further comprising a spigot that is attached to said tank and controls a flow of purified water from said inner chamber.

6. A reverse osmosis water purification system that purifies a source water provided by a source of water, comprising:

a pump which pumps the source water;

an osmotic membrane in fluid communication with said pump, said osmotic membrane receives the source water and provides a purified water;

a tank that has a wall and a base that define an inner chamber that is in fluid communication with said osmotic membrane, said inner chamber receives the purified water from said osmotic membrane through an opening that is located in said wall at an elevation above said osmotic membrane such that the purified water will flow back into said osmotic membrane when a purified water level within said inner chamber is at least at said opening;

an upper level switch that is located no lower than said opening and which is coupled to said pump to terminate the flow of water into said inner chamber when the purified water level within said inner chamber reaches said upper level switch, wherein the purified water flows from said inner chamber back through said osmotic membrane; and, a lower level switch that is located below said opening and which initiates the flow of water when the purified water level falls below said lower level switch.

7. The system as recited in claim 6, further comprising a spigot that is attached to said tank and controls a flow of purified water from said inner chamber.

* * * * *

UNITED STATES PATENT AND TRADEMARK OFFICE
CERTIFICATE OF CORRECTION

PATENT NO. : 5,658,457
DATED : August 19, 1997
INVENTOR(S) : Schoenmeyr It is certified that error appears in the above-identified patent and that said Letters Patent is hereby corrected as shown below:

In the title page, item [54], and column 1, line 1, please delete "HYDROSTICALLY " and insert -- HYDROSTATICALLY --.

Signed and Sealed this

Twenty-sixth Day of January, 1999

Attest:

Attesting Officer

*Acting Commissioner of Patents and Trademarks*